Dec. 22, 1964   G. E. A. WHYTE   3,162,174
WORK SCHEDULING MEANS
Filed May 23, 1963   3 Sheets-Sheet 1
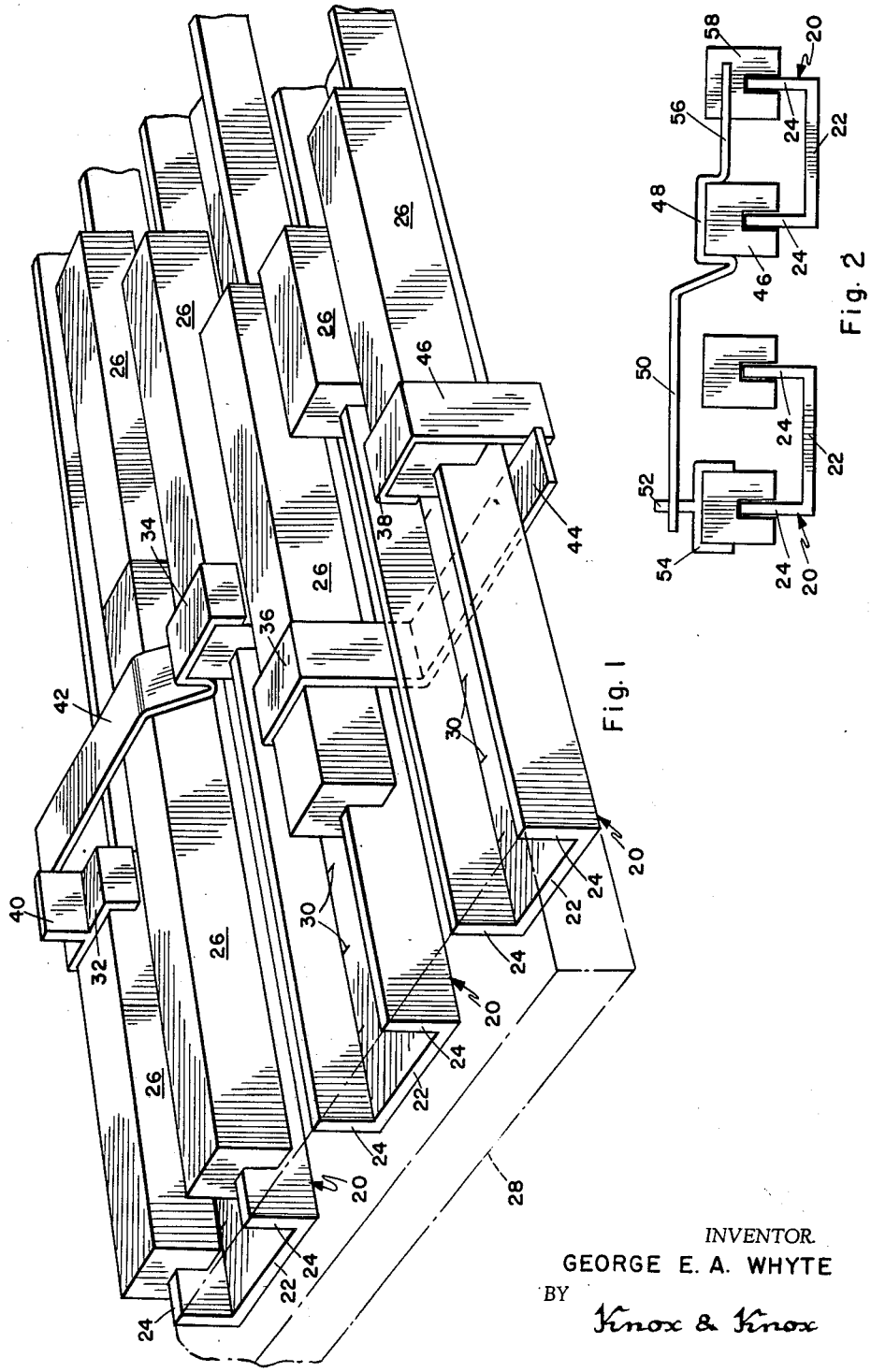
INVENTOR.
GEORGE E. A. WHYTE
BY
Knox & Knox Dec. 22, 1964  G. E. A. WHYTE  3,162,174
WORK SCHEDULING MEANS
Filed May 23, 1963  3 Sheets-Sheet 2

INVENTOR.
GEORGE E. A. WHYTE
BY Knox & Knox

Dec. 22, 1964          G. E. A. WHYTE          3,162,174
                      WORK SCHEDULING MEANS
Filed May 23, 1963                            3 Sheets-Sheet 3
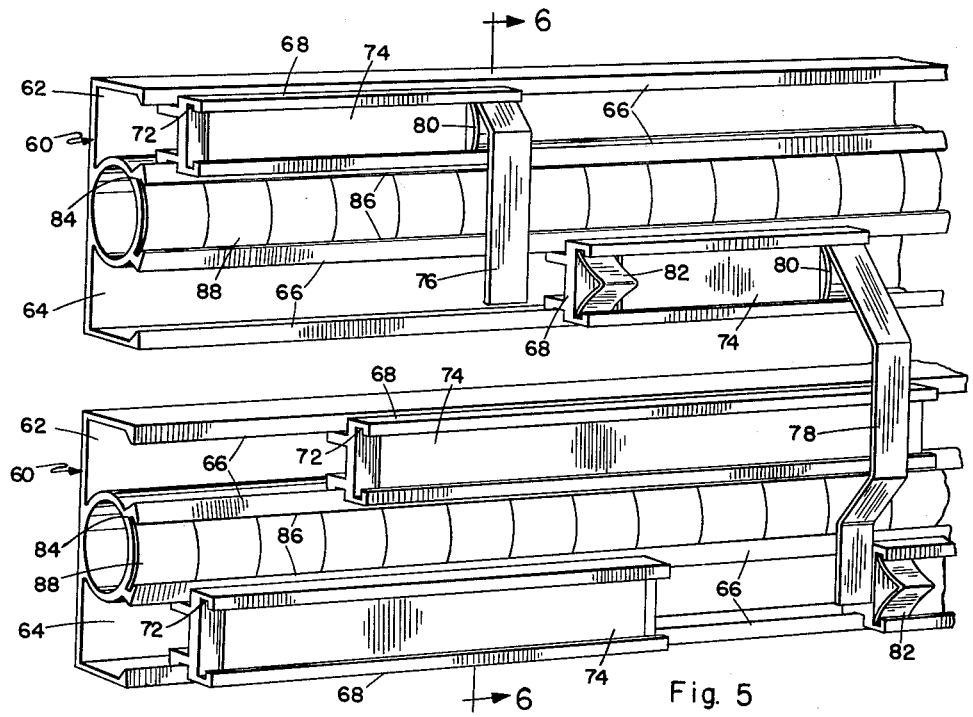
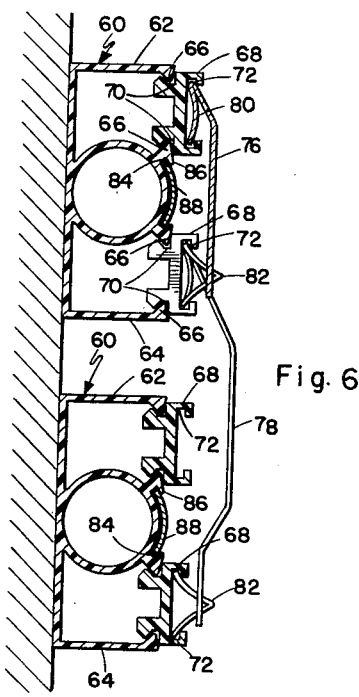
INVENTOR.
GEORGE E. A. WHYTE
BY
Knox & Knox

United States Patent Office 3,162,174
Patented Dec. 22, 1964

3,162,174
WORK SCHEDULING MEANS
George E. A. Whyte, 9125 Jonell Court, La Mesa, Calif.
Filed May 23, 1963, Ser. No. 282,704
4 Claims. (Cl. 116—135)

The present invention relates generally to work scheduling means and more particularly to such means by which project operations may be represented by blocks slidable on guides with means for interconnecting blocks to represent interdependency of operations.

The historical visual aid to planning and scheduling in the construction industry has long been the bar chart. In the use of such a chart the items involved are first listed, then placed on a time scale and squeezed until all the bars fit the chart. Such a chart has many shortcomings. It is usually vague, particularly about job sequence and relationships. It is difficult to revise and to introduce the effects of weather, strikes, delayed deliveries, change orders and the like. It does not clearly indicate which jobs are critical and which jobs have scheduling leeway.

It is accordingly the primary object of this invention to provide an improved apparatus which can be used to set up and follow, through any changes which may occur due to weather or delayed deliveries and the like, the various operations of a construction project or similar business venture.

It is a further object of this invention to provide an improved apparatus which will graphically represent the interdependency of all operations making up a given contract.

It is a still further object of this invention to provide an improved apparatus which will graphically represent the "critical path" of a project, that is, the longest, continuous chain of activities throughout the complete project.

It is a still further object of this invention to provide an improved apparatus which will graphically represent the earliest possible start, and the latest permissible completion, of each operation within the complete project.

Finally it is an object to provide a work scheduling means of the aforementioned character which is simple and convenient to use and which will give generally efficient and durable service. With these and other objects definitely in view, this invention consists in the novel construction, combination and arrangement of elements and portions, as will be hereinafter fully described in the specification, particularly pointed out in the claims, and illustrated in the drawings which form a material part of this disclosure and in which:

FIGURE 1 is a perspective view of a section of a work scheduling means incorporating the novel block structure of my invention;

FIGURE 2 is an end view of a plurality of guides showing a modified form of interconnecting means;

FIGURE 5 is a fragmentary perspective view of a form of the apparatus suitable for vertical mounting; and FIGURE 6 is a sectional view taken on line 6—6 of FIGURE 5.

Figure 3:
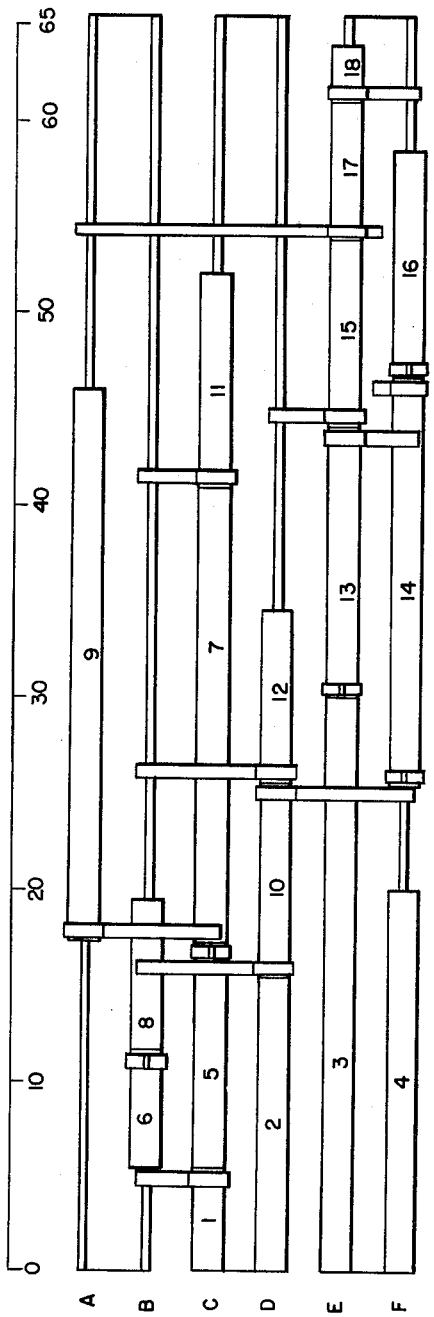
FIGURE 3 is a top plan view of the work scheduling means set up to show all the operations of a construction job.

Basically, my improved work scheduling means consists of a plurality of parallel tracks or guides and a series of blocks of varying lengths shiftably mounted on the guides. Time is indicated by transverse lines spaced on the guide or support at one day intervals. Each block represents a single operation and since the length of time for completion of each operation varies, the length of each block must vary correspondingly. Since certain operations must be completed before others can be started some means must be provided to prevent a block on one guide from passing a block or blocks on another guide. This is accomplished by fastening a clip on one or both of the blocks, the relationship of which is to be maintained. A clip which is being pushed is called a "yoke" and a clip whose function it is to push is called a "pusher."

In FIGURE 1 I have shown a section of my improved work scheduling means to illustrate the principle of operation. Reference numeral 20 represents a series of supporting means which are placed parallel to each other to form guides. In the form shown the supporting means consists of a series of similar channel members, each having a base 22 and side walls 24. Side walls 24 form the guides for the series of blocks 26 of varying lengths. As shown in FIGURE 1 supporting means 20 are positioned with their left hand ends against a fixed stop or abutment 28 so that these ends all be in the same vertical plane. Time and motion are considered to be from left to right. The left hand end of the apparatus is the rear and the right hand end the front. Intervals of time are provided on the supports 20 and may preferably take the form of graduations 30 indicating one day periods.

The simplest means of preventing a block on one guide from passing a block on another guide is to fasten a clip on one or both of the blocks whose relationship it is desired to maintain. Several different forms of clips are shown in FIGURE 1. Clips 32 and 34 co-operate to form one pusher-yoke pair and clips 36 and 38 co-operate to form a second pair. These clips are formed of spring metal so that they may be easily clipped onto and removed from the blocks as desired. When once positioned on a block they remain in place until removed. Each clip is provided with an extension means to co-operate with an extension means on one or more other clips to form interconnecting means therewith. The form that these extension means take will vary with the location of the clip. For example it will be noted that clip 32 has an upwardly extending flange 40 which co-operates with a laterally extending arm 42 on clip 34. It will be noted that this arm extends over a block 26. Clip 36 has a laterally extending arm 44 which is adapted to engage a downwardly extending flange 46 on clip 38. In this co-operating pair I have shown the laterally extending arm in a position below guide means 20. It will be apparent from this disclosure that the type of interengaging means may be varied to suit the needs of the individual layout of guide means and blocks. For example a system of pulleys and belts could be used equally as well and it is within the scope of this disclosure to adapt the scheduling means to an electrical system of interconnecting means between the various blocks.

In FIGURE 2, by way of example I have shown an alternative form of pusher bar. This bar has a clip portion 48 which engages block 49. Extending from one side of clip portion 48 is an arm 50 that engages flange 52 of clip 54. Extending from the opposite side of clip 48 is an arm 56 that engages the rear face of block 58.

While I have shown blocks 26 mounted on the side flanges of channel members it is to be understood that this is representative only. Other suitable means for mounting the blocks could be used equally as well. For example, it might be desirable to make the blocks of magnetically permeable material. In this case the guides could be magnetic rods or bars. Alternatively, the blocks could be provided with spring clips that snap into grooves provided in a base member. If the layout is to be used on a vertical surface horizontally extending shelves may be provided and the blocks supported from these shelves by brackets.

Figure 4:
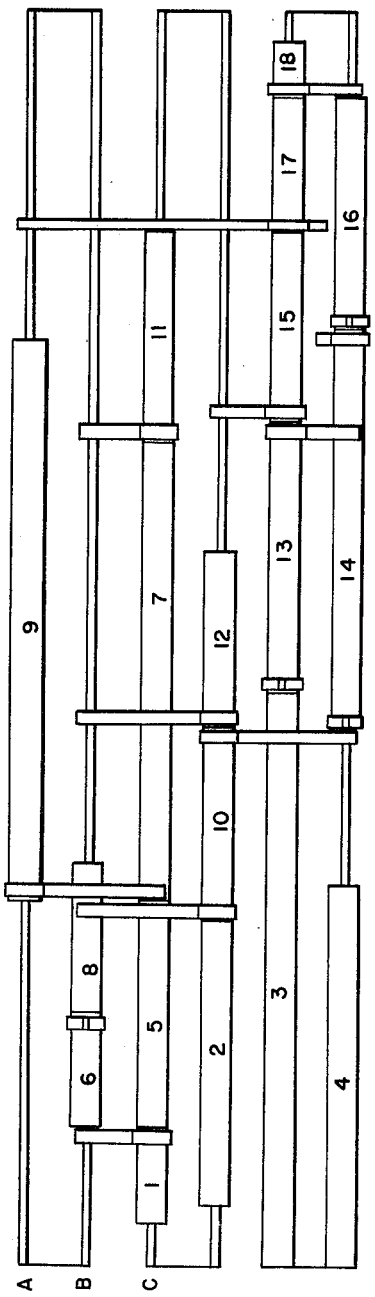
FIGURE 4 is a view similar to FIGURE 3 showing how the slack in certain operations does not effect the critical path.

In FIGURES 3 and 4 I have shown a diagrammatic layout of a construction problem for which my work scheduling means is particularly adapted. As an illustration it is assumed that the immediate problem is to present a schedule for the construction of a pier. The figures at the top of FIGURE 3 represent increments of time.

First, the project must be broken down into separate operations, such as procurement of special items, curing of concrete, periods required for testing and inspections and the like. Each operation is numbered and the normal completion time estimated. It must always be determined which operation is to precede which.

Having completed the breakdown, a table such as indicated below is prepared:

*Table I*

| Operation | Description | Duration in working days | Necessary preceding operations |
|---|---|---|---|
| 1 | Job Mobilization | 5 | |
| 2 | Procure Conc. Piles | 15 | |
| 3 | Procure Steel Piles | 30 | |
| 4 | Procure Riprap | 20 | |
| 5 | Cast Yard and Shop | 12 | 1 |
| 6 | Demolish Existing Pier | 6 | 1 |
| 7 | Manuf. Pre Cast Caps | 24 | 5 |
| 8 | Excavate for Thrust Beam | 8 | 6 |
| 9 | Manuf. Deck Panels | 29 | 5 |
| 10 | Drive Conc. Piles | 10 | 2, 6 |
| 11 | Set Caps | 11 | 7, 8 |
| 12 | Build Thrust Beam | 9 | 5, 8, 10 |
| 13 | Drive Fender Piles | 14 | 10, 3 |
| 14 | Place Riprap | 21 | 10, 4 |
| 15 | Backfill | 10 | 12, 13 |
| 16 | Install Bracing Girts | 12 | 13, 14 |
| 17 | Set Deck Panels | 7 | 11, 15, 14, 9 |
| 18 | Install Hardware | 3 | 16, 17 |

Blocks are now made up corresponding to the duration of each of the 18 operations and labeled each by its number and name. For ease of illustration I have used numbers only in FIGURES 3 and 4.

The solution of the problem is as follows:

Operations 1, 2, 3 and 4 are inserted on rails C, D, E and F, respectively, with the left end of each block in line with the left end of the support or board which is the zero date line. Operation 5 is placed in front of operation 1. Operation 6 is placed on rail B just in front of a pusher on the front of 1. Operation 7 is placed in front of operation 5 and operation 8 in front of operation 6. Operation 9 is placed on guide A and a yoke is attached to it which will insure that it will remain to the right of operation 5 without interfering with the movement of operations 6 or 8 or any other unrelated operations. Operation 10 is now placed in front of operation 2, being the longer chain of operations, and a yoke is put on to hold back operation 6. Operation 11 is placed in front of 7 and a yoke is put on 11 to prevent operation 8 from being moved past it. Operation 12 is placed in front of 10 and a yoke is placed on 12 to hold back 5 and 8. Operation 13 is placed in front of 3, its logical predecessor, and a yoke is placed on 13 and a pusher on 10 to indicate that the fender piles cannot be driven until the thrust beam has been poured. Operation 14 is now placed in front of 4 and the pusher on 10 is extended to interact with a small yoke on 14. Place operation 15 in front of 13 and fit a yoke on 15 to hold back 12. Operation 16 is placed in front of 14 and a yoke is put on 16 to interact with a pusher on 13. Operation 17 is placed ahead of 15 with a yoke to be pushed by 11, 15 and 9. The last operation, 18, is placed in front of 17 with a yoke to hold back 16.

It is optional as to which operation is placed in front of a preceding operation and which is to be controlled by a yoke and pusher but in general it is most convenient to have each critical sub-path as much as possible on one rail.

As the work scheduling means as now set up it is a relatively simple matter to determine the critical path of operations, that is, the longest continuous chain of operations throughout the complete project which determines the overall length of time for completion of the project. By moving operation 18 slightly to the left it will be seen that this causes movement of 17, 15, 13 and 3. The position of 18 is therefore dependent of these same operations which can be checked to total 64 days. The chain of operations 3, 13, 15, 17 and 18 therefor is the critical path.

In FIGURE 4 I have shown diagrammatically how the scheduling means may be changed to compensate for delays or "float" in non-critical paths which can be effected without comprising the 64 day completion schedule. For example two days float can be allowed for operations 1, 5, 7 and 11 jointly. FIGURE 4 shows these operations moved to the right so that operation 11 engages the yoke on 17. Operations 2, 10, 14 and 16 jointly may take three days longer to complete before they affect the critical path as seen by the revised location in FIGURE 4. With these changes it is apparent that operation 4 now may take an extra five days before it holds up the start of operation 14 the start of which could be delayed three days before this operation becomes critical. Operations 6, 9, 8 and 12 can be timed to suit other than schedule requirements such as maintaining steady labor force, allocation of equipment etc.

From the foregoing description it is apparent that I have provided a work scheduling means on which each individual operation is visible at a glance. Should alternate methods of construction be considered, which would either change the duration of any operations or their sequential relationship, the effect on the schedule can be immediately determined. Should actual progress deviate from the schedule a revised schedule can be immediately established simply by adding or removing blocks of revised length.

Illustrated in FIGURES 5 and 6 is one form of structure in which the movable blocks are secured to the channel members, so that the assembly can be hung vertically for ease of use and visibility and to effect a very important saving in space. Each channel member 60 has upper and lower tracks 62 and 64 with inwardly opposed longitudinal flanges 66. Blocks 68 have longitudinal grooves 70 in which flanges 66 are slidable, so that the blocks are held in the tracks. The front face of each block 68 has a flanged channel 72 in which a label or card 74 can be inserted for identification of the block. Clips are used for pushers and yokes as described above, typical extended arm type clips 76 and 78 have resilient retaining portions 80 which snap into flanged channels 72 and hold the clips on the blocks. Other clips 82, comparable to clips 32, are substantially V-shaped resilient elements which also snap into flanged channels 72.

Between tracks 62 and 64 in each channel member 60 is a central track 84 having opposed flanges 86, in which interval markers 88 are inserted to indicate days or other suitable time increments. The function of the assembly is as described above, with various combinations of blocks representing different operations.

It is understood that minor variation from the form of the invention disclosed herein may be made without departure from the spirit and scope of the invention, and that the specification and drawings are to be considered as merely illustrative rather than limiting.

I claim:

1. A device for use in scheduling the rate and time of performance of the work of a plurality of operations comprising:

supporting means including a plurality of elongated spaced parallel guides;
   a series of blocks with certain of said blocks shiftably mounted on each of said guides; and
   first means removably connected to a first block on one guide, spanning an adjacent guide and permitting independent movement of any blocks on the spanned guide and second means removably connected to a block on a guide remote from said one guide and adapted to be engaged by said first means.

2. A device for use in scheduling the rate and time of performance of the work of a plurality of operations comprising:

supporting means including a plurality of elongated, spaced parallel guides divided into increments of time;

a series of blocks of varying lengths with certain of said blocks shiftably mounted on each of said guides and means comprising a pusher bar removably connected to a first block on one guide, spanning an adjacent guide and permitting independent movement of any blocks on the spanned guide, and a yoke removably connected to a block on a guide remote from said one guide and adapted to be engaged by said pusher bar.

3. A device for use in scheduling the rate and time of performance of the work of a plurality of related operations, comprising:

supporting means including a plurality of elongated spaced parallel guides having paired opposed longitudinal flanges defining tracks therebetween;

a series of blocks slidably mounted in each of said tracks and having grooves engaged by said flanges; and first means removably connected to a first block on one guide, spanning an adjacent guide and permitting independent movement of any blocks on the spanned guide and second means removably connected to a block on a guide remote from said one guide and adapted to be engaged by said first means.

4. A device as claimed in claim 3 in which said blocks have flanged channels, and said interconnecting means includes clips having retaining portions engageable in said channels.

References Cited by the Examiner

UNITED STATES PATENTS

| | | | |
|---|---|---|---|
| 1,859,750 | 5/32 | Pratt | 35—24 |
| 2,622,346 | 12/52 | Guichard | 35—24 |
| 3,124,885 | 3/64 | Mendell | 35—24 |

FOREIGN PATENTS 814,054   9/51   Germany.

LOUIS J. CAPOZI, *Primary Examiner.*